United States Patent [19]

Sherowski

[11] Patent Number: 5,740,834
[45] Date of Patent: Apr. 21, 1998

[54] REVERSE ANGLE INTEGRALLY COUNTER-WEIGHTED TRICKLE VALVE

[75] Inventor: Gregory S. Sherowski, Whippany, N.J.

[73] Assignee: Exxon Research and Engineering Company, Florham Park, N.J.

[21] Appl. No.: 691,735

[22] Filed: Aug. 2, 1996

[51] Int. Cl.[6] .................................................. F16K 15/00
[52] U.S. Cl. ............................. 137/527.6; 137/527.8
[58] Field of Search ............................ 137/527.6, 527.8

[56] References Cited

U.S. PATENT DOCUMENTS

| 151,548 | 6/1874 | Schmitz | 137/527.8 |
|---|---|---|---|
| 189,549 | 4/1877 | Clapp | 137/527.8 |
| 651,964 | 6/1900 | Codd | 137/527.8 |
| 2,277,295 | 3/1942 | Brwon | 137/527.8 |
| 2,838,063 | 6/1958 | Weits et al. | 137/527.6 |
| 2,901,331 | 8/1959 | Held et al. | 137/527.6 |
| 4,074,691 | 2/1978 | Luckenbach | 137/527.6 |
| 4,494,564 | 1/1985 | Lukacz | 137/527.6 |
| 4,996,028 | 2/1991 | Danielsen et al. | 137/527.6 |

*Primary Examiner*—Denise L. Ferensic
*Assistant Examiner*—Joanne Y. Kim
*Attorney, Agent, or Firm*—Roy J. Ott

[57] ABSTRACT

A trickle valve useful for removing solids from the bottom of a cyclone separator dipleg includes a valve seat and a reverse angle, integrally counter-weighted flapper plate pivotally mounted on the valve and closed against the valve seat which opens to release particulate solids built up in said dipleg before the solids build to a level greater than their angle of internal friction, thereby clogging the dipleg. The valve seat is at an angle of less than 90° to the horizontal (i.e., 60°) and the counterweight is flush mounted on the plate by welding as an integral part of the plate so that the plate can easily open to 90°. This is useful with cyclones in catalytic crackers and particularly with secondary cyclones in which the fluidized solids loading is relatively light.

16 Claims, 3 Drawing Sheets

5,740,834

REVERSE ANGLE INTEGRALLY COUNTER-WEIGHTED TRICKLE VALVE

BACKGROUND OF THE INVENTION

1. Field of the Invention

The invention relates to a reverse angle, counter-weighted trickle valve useful for cyclones. More particularly, the invention relates to a trickle valve comprising a reverse angle, integrally counter-weighted and pivoted flapper plate actuated by a very low pressure differential, wherein the counter weight is an integral part of the flapper plate adjacent to the exterior plate surface, with its center of mass above the valve pivot.

2. Background of the Disclosure

There are many processes in the petroleum refinery and other chemical process areas which utilize equipment for separating fine solid particles from a fluidizing or other gas and for separating fine solid particles from larger particles. One example of such a process is the fluid catalytic cracking (FCC) process, for producing primarily liquid petroleum fuel products from heavy gas oils, in which a preheated gas oil feed is brought into contact with a hot cracking catalyst which is in the form of a fine powder, typically having a particle size of from about 10–200 microns, usually a mean particle size of about 70–100 microns, for the desired cracking reaction to take place. The catalyst particles are fluidized by the hydrocarbon vapors in a cracking zone which produces the cracked products and coked catalyst particles. The hydrocarbon vapors and coked catalyst particles are then fed to a separating zone which contains cyclone separators for separating the coked catalyst particles from the hydrocarbon vapors. Both primary and secondary cyclones are employed. The separated catalyst particles are fed into a stripping zone from diplegs protruding down from the cyclones. The stripped catalyst particles are then sent to a regenerating zone in which the coke is burned off with an oxygen containing gas, typically air, to form regenerated catalyst particles and a flue gas. Primary and secondary cyclones in the regenerating zone separate the flue gas from the regenerated catalyst particles. The hot, regenerated catalyst particles exit from diplegs protruding down from the cyclones and are returned to the regenerated catalyst bed and subsequently to the cracking zone where they contact fresh feed. The flue gas exits out the top of the regenerating zone.

In all processes in which solid particles are separated from gasses or vapors, it is necessary to prevent fluidizing and regenerating gasses and the like from entering up into the dipleg of the cyclone and thereby impair it's effectiveness. Trickle valves located at the bottom of the cyclone dipleg are used for this purpose and typically consist of an angularly oriented conduit having one end (the upper end) operably connected to the dipleg of the cyclone and a hinged flapper or closure plate at the other or bottom end for opening and closing the conduit. Examples of these trickle valves can be found, for example, in U.S. Pat. Nos. 5,428,907; 5,101,855; 4,996,028; 4,494,564; 4,074,691 and 2,838,065. These patents demonstrate an ongoing effort over the past forty years to improve the operation of trickle valves. The problem of achieving a satisfactory valve design and concomitant performance has been particularly acute in dilute phase solids contacting zones in which the solid particles are relatively small and the fluidizing gas is relatively lightly loaded with particles, as is the case with a secondary cyclone used for separating and recovering an FCC catalyst from the cracked hydrocarbon products. By lightly loaded is generally meant less than about 0.25 pounds of fluidized catalyst per cubic foot of gas. In a situation like this there are times when the fine particulate solids deaerate and build up in the bottom of the dipleg, thereby plugging it. There is still a need for a trickle valve that will provide satisfactory operation in fluid solids contacting zones and particularly in a dilute phase fluid solids contacting zone in which space is at a premium, thereby rendering it difficult to orient the valve if it possesses a protruding structure.

SUMMARY OF THE INVENTION

The present invention relates to a trickle valve which includes a tubular body terminating at its bottom end in a valve seat over which is disposed an integrally counter-weighted flapper plate having an inner and an outer surface. The flapper plate is pivotally mounted by pivot means to cover the valve seat when the valve is in a closed position and which swings away from the valve seat when the valve is in the open position. The flapper plate counter weight is disposed on the surface of the plate with the center of mass of the weight being above the pivot means, so that the center of mass of the flapper plate and counter-weight assembly is above the pivot means for urging the flapper plate against the valve seat in the closed position. The counter weight is mounted to the plate by any suitable means and preferably flush mounted and welded to the flapper plate so that it is an integral part of the plate. The valve seat is disposed at an angle of less than 90° to horizontal and preferably less than 80°. The valve plate is mounted on the pivot means so that it is urged against the valve seat in the closed position when the weight of the solids in the bottom of the dipleg is insufficient to open it and then swings open down and away from the valve seat when activated by the weight of the particles. The opening and closing of the flapper plate depends on the weight of the particles and gas pressure inside the dipleg and the gas pressure outside the dipleg. The flapper plate is reverse angle mounted in that it swings down and away from the valve seat to open and swings back up to achieve the closed position. In an embodiment in which the trickle valve of the invention is used on a cyclone separator in a fluid cat cracking unit, the valve seat and the flapper plate in the closed position are oriented at an angle of from about 50° to 70° and preferably from 55° to 65° from the horizontal. The tubular body is substantially vertically oriented and the counter weight is sized so as to cause the flapper plate to swing open at a relatively low pressure of from about 0.02–0.25 psig., preferably 0.02–0.10 psig. and still more preferably 0.03–0.07 psig. The flapper plate may have a refractory coating on one or both of its faces. The pivot means comprises typical "O" rings depending from a bracket mounted on the upper portion of the valve. In one embodiment, the pivot is connected to the upper portion of the flapper plate which terminates in a tongue or extension which extends above the pivot, with the counter weight attached to the outer surface of the extension.

DETAILED DESCRIPTION

For the sake of convenience, the invention is described in particular detail with respect to a fluidized bed reactor containing a single primary and secondary cyclone, each having a dipleg at the bottom of which terminates in a flapper valve of the invention. However, those skilled in the art will appreciate that fluid solids contacting apparatus, like fluid catalytic cracking reactor units and their associated regenerator units, contain a plurality of both primary and secondary cyclones located within each vessel and the flapper valve of the present invention is well suited for use with the cyclones in those units and particularly with the secondary cyclones which handle the more dilute phase solids having a lighter density which produces the lightest loading on the dipleg valve.

Figure 1:
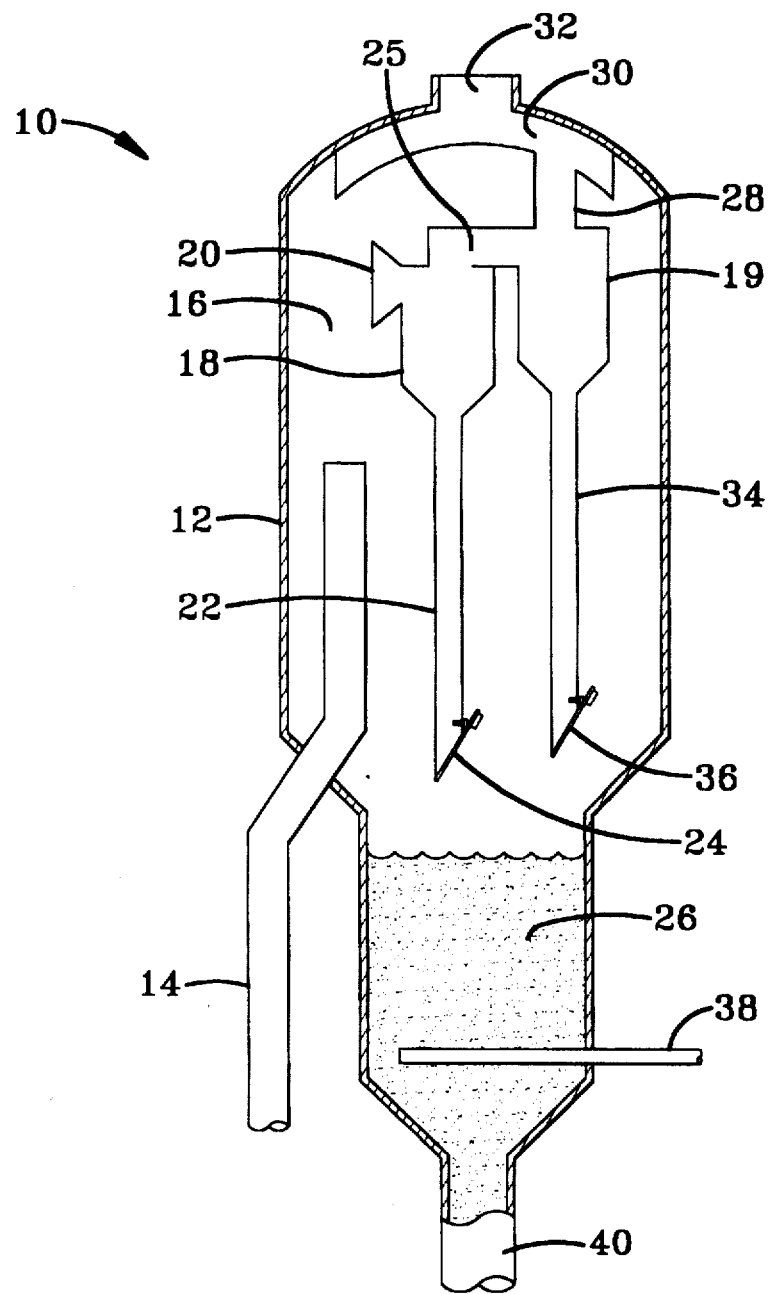
FIG. 1 is a vertical section of a vessel having a primary and a secondary cyclone separator positioned within the vessel to which the flapper valve of the invention is attached.

Referring to FIG. 1, a fluid solids contacting vessel roughly depicted as a fluidized bed catalyst cracking unit 10 includes an outer shell 12 which is provided with a riser 14 in which vaporized hydrocarbons are cracked by contact with hot, fluidized catalyst particles suspended in the hydrocarbon vapors or gas. The mixture of hot hydrocarbon vapors and fluidized catalyst particles are introduced into the reactor vessel at a position within the upper or disengaging zone 16 of vessel 10 which contains a plurality of primary and secondary cyclones for separating the particles from the vapors, of which only two, 18 and 19 are shown for convenience. The catalyst particles and hot hydrocarbon vapors enter a primary cyclone 18 via entrance 20 for primary separation of the hydrocarbon vapors and catalyst particles. In the primary cyclone most of the catalyst particles, but not all, are separated from the hydrocarbon vapors and pass into dipleg 22, exiting the dipleg via flapper valve 24 and then falling into stripping zone 26 below. The vapors exiting from the primary cyclones still contain some catalyst particles and are fed to secondary cyclones, of which cyclone 19 is but an illustrative, but nonlimiting example. Thus, the hydrocarbon product vapors containing the remaining particles enter secondary cyclone 19 via entrance 25 from which the vapors exit via conduit 28 into plenum 30 and then out through conduit 32. The catalyst particles which are separated from the product vapors in secondary cyclone 19 and are still in a fluidized state are fed via dipleg 34 and flapper valve 36 of the invention into spent catalyst stripping zone 26 below. A stripping gas such as steam is introduced near the bottom of the unit via line 38 and strips remaining vaporizable hydrocarbon liquids off the spent catalyst particles to produce additional hydrocarbon vapors and steam which enter up into zone 16 wherein they mix with the cracked hydrocarbon vapors and spent catalyst particles being fed to the cyclones. As is illustrated in the Figure, flapper valves 24 and 36 are located at the bottom of respective diplegs 22 and 36. The spent catalyst particles in zone 26 are in a fluidized state and are removed from the cracking unit via line 40 from where they are sent to the catalyst regenerator (not shown). Flapper valves 24 and 36 are both integrally counter-weighted, reverse angle flapper valves according to the invention and are described in detail below.

Figures 2A, 2B:
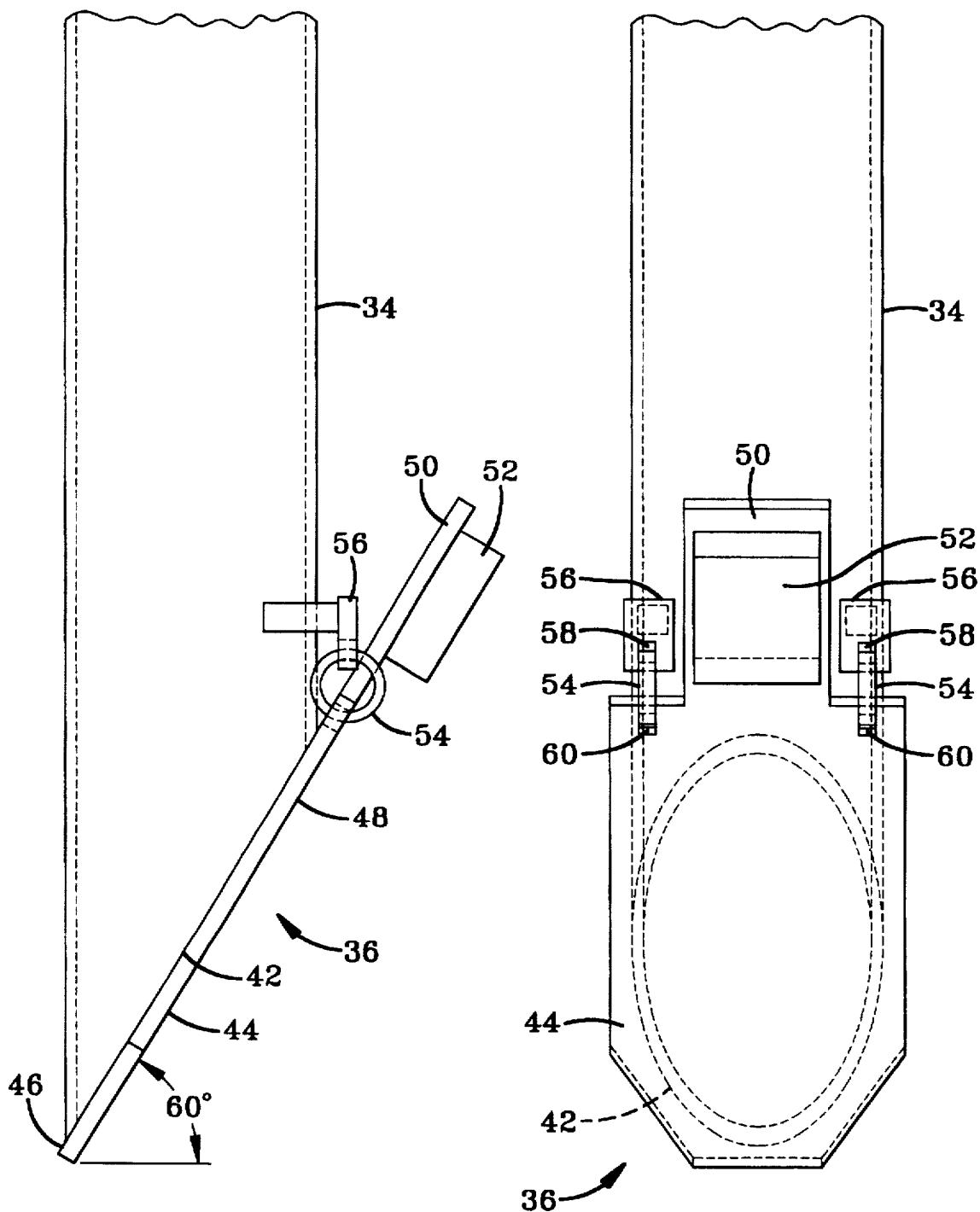
FIGS. 2(a), (b) and (c) schematically illustrate side and front views of a flapper valve of the invention in the closed and open positions.
Figure 2C:
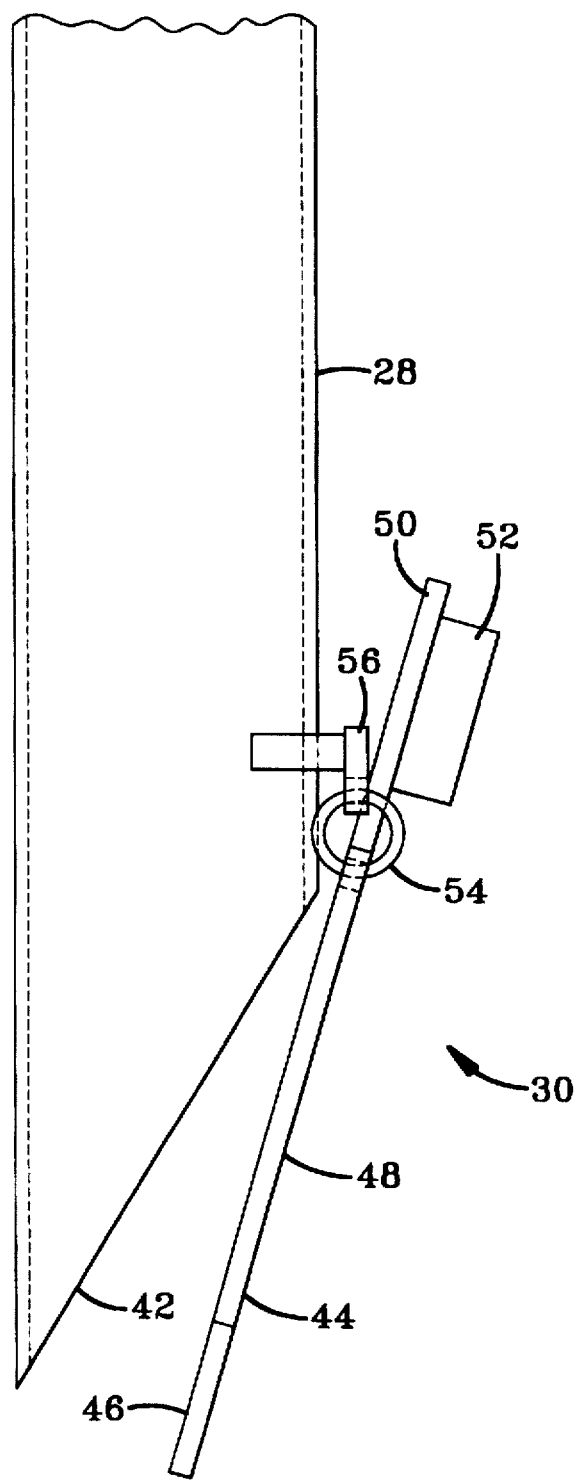

Turning now to FIG. 2, FIGS. 2(a) and 2(b) schematically illustrate a side and front schematic view, respectively of a flapper valve 36 of the invention in the closed position, while FIG. 2(c) schematically illustrates a side view of the valve in an open position of about 80°. Thus, dipleg 34 of cyclone 19 is a tubular body which terminates at its bottom in a valve seat 42 which, in the illustration shown, is at an angle of about 60° from horizontal in the embodiment shown and forms the end of dipleg 34. This relatively steep angle of the valve seat insures that the exit flow area of the downcoming fluidized catalyst or other particles exit in the same plane as the open dipleg area and not build up on the bottom as can occur in the design of the '028 patent referred to above. Thus, because the flapper plate opens down and out with its maximum fully open position being vertical, there is nothing to obstruct the downflow of the catalyst particles unlike prior art designs in which the valve includes a curved dipleg terminating in a vertically oriented dipleg valve opening as in the '028 patent. It has been found that if the dipleg valve seat is vertical or at a relatively small angle with respect to horizontal, thereby requiring the flapper plate to swing out and up to open, catalyst particles can and do buildup in the dipleg and this can result in plugging the dipleg, thereby rendering the valve inoperable. The actual angle of the valve seat is determined to some degree by the angle of internal friction of the fluidized solid particulate mass. As is known to those skilled in the art, this is an inherent physical property of the specific material and has a strong dependence on particle shape, size and whether any material is adsorbed on the surface (i.e., coke in the case of a spent catalyst). The angle of internal friction of a particulate mass may be measured according to bin flow tests which are given, for example, in "Fluidization and Fluid-Particle Systems", by Zenz and Othmer (Reinhold, N.Y.). For particles having a mean diameter of about 70 microns, this angle is typically between 60°–80° from the horizontal. Free flowing bulk solids shear against stationary bulk solids along the plane determined by their angle of internal friction. In the embodiment shown, the 60° angle insures that the flapper plate opens to about 80° with minimal movement of the counterweight and to a fully open position of 90°. Thus for fluidized catalyst particles having an internal friction angle of 78°, this insures that there is never any restriction which would prevent solids from flowing out of the dipleg once the flapper plate is in the open position. Thus, in a preferred embodiment of the invention the flapper plate will open at an angle to the horizontal of approximately the angle of internal friction of the particulate solids in the dipleg with minimal movement of the plate and under the lightest loading practical for efficient operation of the valve without incurring back flow of gas up through the dipleg. As set forth under the SUMMARY, the tubular body portion of the valve is substantially vertically oriented and the counter weight is sized so as to cause the flapper plate to swing open at a relatively low pressure of from about 0.02–0.25 psiq., preferably 0.02–0.10 psig. and still more preferably 0.03–0.07 psig.

The flapper or trickle valve 36 includes a flapper plate 44 which is typically a flat metal plate sized so as to extend beyond the valve seat 42, having an interior surface 46 which engages the valve seat 42 in the closed position and an outer surface 48. The length and width of flapper plate 44 extend slightly beyond the outer periphery of the valve seat 42 so that lateral and vertical movement of the flapper plate and valve opening due to vibrations during operation of the cyclone do not result in opening of the valve. At the option of the practitioner and depending on the application, either or both the interior or exterior surfaces 46 and 48, of flapper plate 44 may be covered or lined with refractory material as is known to those skilled in the art. The upper portion of flapper plate 44 terminates in a tongue or extension 50. As shown in the Figures, the tongue or extension 50 is an integral part of the plate itself and is shorter than the portion thereof which engages the valve seat. In the embodiment shown, counterweight 52 is disposed directly on the outer surface of the flapper plate extension 50 by any suitable means such as welding, rivets or bolts (preferably welding) and is thereby essentially an integral part of the flapper plate. As shown, a pair of "O" shaped hinges 54 which depend from a T-shaped bracket 56 are used as pivot means to pivotally mount the flapper plate 44 so that it is positioned to engage the valve seat 42 when the valve is closed and may open at an angle of 80° and more. As shown in the Figures, both the T-shaped support bracket 56 and the flapper plate 44 have corresponding respective openings 58 and 60 which are larger in diameter than the rod used to make the "O" shaped rings 54, which permits the lateral as well as rotational movement of the hinge rings to accommodate vibrational movement during operation of the cyclone. Counterweight 52 is positioned so the center of its mass centroid and that of the flapper plate and counterweight assembly are above the center of the hinge means which comprises the "O" shaped rings, brackets and holes. As counterweight 52 is disposed adjacent the outer surface of the flapper plate extension 50 and thereby an integral part of the flapper plate, it does not protrude much beyond the outer surface 48 of the flapper plate. The number of cyclones that can be placed into a given cross-sectional area is generally limited by the size of the cyclone itself and not the smaller dipleg. However, to the extent that an outwardly protruding structure associated with a flapper valve can also limit the number of cyclones within a given cross-sectional area, this limitation is avoided by the flapper valve of the invention. Substantially protruding counterweighted flapper plates of the prior art are disclosed, for example, in U.S. Pat. Nos. 2,838,065 and 4,494,564, and also the massive flapper plate disclosed in U.S. Pat. No. 5,428,907. The integrally counter-weighted flapper valve of the invention is more foolproof, cheaper and easier to fabricate, and also results in a more sensitive and faster acting flapper valve. It is also easier to orient inside a unit than the prutruding prior art designs. The actual mass of the counterweight is determined by the specific application so that the flapper plate will open with a minimal amount of solids collected in the dipleg. This precludes any significant accumulation of solids which could deaerate and defluidize and thereby become unable to transmit pressure to the flapper plate. With a substantially vertically oriented tubular body portion of the valve and the angle of the valve seat generally ranging from about 50° to 70° and typically from 55° to 65° to the horizontal, depending on the angle of internal friction of the particles in the dipleg, the flapper plate and counter weight can be sized so as to cause the flapper plate to swing open at a relatively low pressure of from about 0.02–0.25 psiq., typically 0.02–0.10 psig. and preferably 0.03–0.07 psig. Further, the integral counterweighted design of the flapper plate will result in a horizontal protrusion of the plate of no more than about twelve inches for a tubular dipleg having a twenty inch diameter, whereas the prior art counterweight protrusions estimated from the drawings in the disclosures can protrude from about eighteen to thirty-six inches for a twenty inch diameter dipleg.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A reverse angle, integrally counter-weighted trickle valve for the dipleg of a cyclone useful for separating particulate solids from gas comprising:

(i) a tubular body terminating at one end in a valve seat disposed at an angle of less than 90° from horizontal;

(ii) a flapper plate having an interior surface, an exterior surface, a valve seat engaging portion and a tongue extending upwards of said valve seat engaging portion with said interior surface of said valve seat engaging portion engaging said valve seat when said valve is in the closed position and said tongue being shorter than said valve seat engaging portion;

(iii) means for pivotally mounting said flapper plate whereby said plate engages said valve seat when said valve is in a closed position and swings down and away from said valve seat to an open position, and (iv) counterweight means disposed adjacent said surface of said tongue for urging said plate against said valve seat in said closed position, wherein the mass centroid of said plate and counterweight means combination is above said hinge means.

2. A valve according to claim 1 wherein said hinge means permits both lateral and rotational movement and said counterweight is disposed adjacent said exterior surface of said tongue.

3. A valve according to claim 2 wherein said valve seat and said plate are disposed at an angle of less than 80° from horizontal in the closed position and wherein said plate is a unitary body.

4. A valve according to claim 3 wherein said valve seat is disposed at an angle of between about 50°–70° from horizontal and wherein said plate is attached to said mounting means at a location between said counterweight means and said valve seat engaging portion.

5. A valve according to claim 4 wherein said flapper plate opens at a pressure differential of between 0.02–0.25 psig.

6. A cyclone useful for separating particulate solids from a fluidizing gas which includes a downwardly protruding dipleg terminating at one end in a reverse angle, integrally counter-weighted trickle valve for removing solids from said cyclone, said valve comprising:

(i) a tubular body terminating at one end in a valve seat disposed at an angle of less than 90° from horizontal, said body opening substantially vertically downward;

(ii) a flapper plate having an interior surface, an exterior surface, a valve seat engaging portion and a tongue extending upwards of said valve seat engaging portion with said interior surface of said valve seat engaging portion engaging said valve seat when said valve is in the closed position and said tongue being shorter than said valve seat engaging portion;

(iii) means for pivotally mounting said flapper plate whereby said plate engages said valve seat when said valve is in a closed position and swings down and away from said valve seat to an open position, and (iv) counterweight means disposed adjacent said surface of said tongue for urging said plate against said valve seat in said closed position, wherein the mass centroid of said plate and counterweight means combination is above said hinge means.

7. A cyclone according to claim 6 wherein said hinge means permits both lateral and rotational movement and said counterweight is disposed adjacent said outer surface of said tongue.

8. A cyclone according to claim 7 wherein said valve seat and said plate are disposed at an angle of less than 80° from horizontal in the closed position and wherein said plate is a unitary body.

9. A cyclone according to claim 8 wherein said valve seat is disposed at an angle of between about 50°–70° from horizontal and wherein said plate is attached to said mounting means at a location between said counterweight means and said valve seat engaging portion.

10. A valve according to claim 9 wherein said flapper plate opens at a pressure differential of between 0.02–0.25 psig.

11. A valve according to claim 1 wherein said tubular body opens substantially vertically downward.

12. A valve according to claim 6 wherein said tubular body opens substantially vertically downward.

13. A valve according to claim 1 wherein said flapper plate opens at a pressure differential of between 0.02–0.25 psig.

14. A valve according to claim 3 wherein said flapper plate opens at a pressure differential of between 0.02–0.25 psig.

15. A cyclone according to claim 7 wherein said flapper plate opens at a pressure differential of between 0.02–0.25 psig.

16. A cyclone according to claim 9 wherein said flapper plate opens at a pressure differential of between 0.02–0.25 psig.

* * * * *